(12) United States Patent
Taylor

(10) Patent No.: US 10,175,004 B2
(45) Date of Patent: Jan. 8, 2019

(54) METHOD OF SERVICING MODULAR PLATE AND SHELL HEAT EXCHANGER

(71) Applicant: Westinghouse Electric Company LLC, Cranberry Township, PA (US)

(72) Inventor: Creed Taylor, Chattanooga, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 544 days.

(21) Appl. No.: 14/879,397

(22) Filed: Oct. 9, 2015

(65) Prior Publication Data

US 2016/0033216 A1 Feb. 4, 2016

Related U.S. Application Data

(62) Division of application No. 12/432,147, filed on Apr. 29, 2009.

(51) Int. Cl.
*B23P 15/16* (2006.01)
*F28D 9/00* (2006.01)
(Continued)

(52) U.S. Cl.
CPC ............ *F28D 9/0006* (2013.01); *B23P 15/26* (2013.01); *F28D 9/0031* (2013.01); *F28F 3/083* (2013.01);
(Continued)

(58) Field of Classification Search
CPC ........ F28D 7/06; F28D 9/0006; F28D 9/0031; F28D 2021/0054; F28G 15/00;
(Continued)

(56) References Cited

U.S. PATENT DOCUMENTS 2,938,712 A * 5/1960 Pellmyr .................... F28D 7/06
122/235.11
3,796,547 A 3/1974 Muenger
(Continued)

FOREIGN PATENT DOCUMENTS

CN 1202236 12/1998
CN 1238833 A 12/1999
(Continued)

OTHER PUBLICATIONS

Westinghouse Electric Company LLC, EP 13735908.9 Supplementary European Search Report, dated Dec. 15, 2015, 7 pages.
(Continued)

*Primary Examiner* — David Bryant
*Assistant Examiner* — Lee A Holly
(74) *Attorney, Agent, or Firm* — Richard J. Coldren; Westinghouse Electric Company LLC

(57) ABSTRACT

A modular plate and shell heat exchanger in which welded pairs of heat transfer plates are placed in the shell in order to transfer heat from a secondary fluid to a primary fluid. The heat transfer plates are removably connected using gaskets to header pipes which are connected to a primary fluid inlet and a primary fluid outlet nozzle. The header pipes are supported by a structure which rests on an internal track which is attached to the shell and facilitates removal of the heat transfer plates. The modular plate and shell heat exchanger has a removable head integral to the shell for removal of the heat transfer plates for inspection and replacement.

5 Claims, 1 Drawing Sheet

(51) Int. Cl.
*F28F 3/08* (2006.01)
*B23P 15/26* (2006.01)
*F28G 15/00* (2006.01)
*F28D 21/00* (2006.01)

(52) U.S. Cl.
CPC ...... *F28G 15/00* (2013.01); *F28D 2021/0054* (2013.01); *F28F 2280/02* (2013.01); *Y10T 29/49352* (2015.01)

(58) Field of Classification Search
CPC ....... B23P 15/16; F28F 3/083; F28F 2280/02; Y10T 29/49352
See application file for complete search history.

(56) References Cited

U.S. PATENT DOCUMENTS

| | | | |
|---|---|---|---|
| 4,128,125 A * | 12/1978 | Borjesson | F28D 9/04 165/163 |
| 4,136,734 A | 1/1979 | Sasaki et al. | |
| 4,323,398 A | 4/1982 | Simon | |
| 4,432,307 A | 2/1984 | Godin | |
| 4,461,346 A | 7/1984 | Hoshino et al. | |
| 4,548,260 A | 10/1985 | Stachura | |
| 4,741,392 A | 5/1988 | Morse | |
| 4,869,067 A | 9/1989 | Sears | |
| 5,088,552 A | 2/1992 | Raunio | |
| 5,131,459 A | 7/1992 | Thompson et al. | |
| 5,383,517 A | 1/1995 | Dierbeck | |
| 5,400,853 A | 3/1995 | Wolters | |
| 5,452,758 A | 9/1995 | Mauterer | |
| 5,590,707 A | 1/1997 | Mauterer | |
| 6,918,433 B2 * | 7/2005 | Kontu | F28F 9/22 165/135 |
| 7,066,241 B2 | 6/2006 | Garimella | |
| 7,204,300 B2 | 4/2007 | Kontu et al. | |
| 2003/0131977 A1 | 7/2003 | West | |
| 2004/0188060 A1 * | 9/2004 | Finch | F28F 9/0075 165/67 |
| 2004/0188078 A1 | 9/2004 | Wu et al. | |
| 2006/0201652 A1 | 9/2006 | Leeson et al. | |
| 2007/0251671 A1 | 11/2007 | Barnes et al. | |
| 2007/0295479 A1 | 12/2007 | Fulmer | |
| 2008/0179049 A1 | 7/2008 | Mathur et al. | |
| 2009/0133861 A1 | 5/2009 | Kim | |
| 2010/0162967 A1 | 7/2010 | Taylor | |
| 2010/0276128 A1 | 11/2010 | Taylor | |

FOREIGN PATENT DOCUMENTS

| | | |
|---|---|---|
| CN | 1913136 A | 2/2007 |
| CN | 102187174 | 9/2011 |
| EP | 0174554 | 3/1986 |
| FR | 2510729 | 2/1983 |
| GB | 356687 | 9/1931 |
| GB | 2054819 | 2/1981 |
| JP | S61181965 | 11/1986 |
| JP | S63213629 | 9/1988 |
| JP | H01119650 | 5/1989 |
| JP | H02187593 | 7/1990 |
| JP | H0590167 | 12/1993 |
| JP | H07113594 | 5/1995 |
| JP | H11294973 | 10/1999 |
| JP | 2011-120585 | 4/2000 |
| JP | 2001041681 | 2/2001 |
| JP | 2002327991 | 11/2002 |
| TW | 201042232 A1 | 12/2010 |
| WO | 9109262 | 6/1991 |
| WO | 99/30099 | 6/1999 |
| WO | WO2006091173 | 8/2006 |
| WO | 2008/046952 | 4/2008 |
| WO | WO2009152830 | 12/2009 |
| WO | WO2010132302 | 11/2010 |

OTHER PUBLICATIONS

Westinghouse Electric Company LLC, Translation of TW 102101227 Search Report, dated Aug. 5, 2016, 1 page.

* cited by examiner

METHOD OF SERVICING MODULAR PLATE AND SHELL HEAT EXCHANGER

CROSS REFERENCE TO RELATED APPLICATION

This application is a divisional application of and claims priority to U.S. patent application Ser. No. 12/432,147, filed Apr. 29, 2009 entitled, MODULAR PLATE AND SHELL HEAT EXCHANGER.

BACKGROUND OF THE INVENTION

1. Field of the Invention

The present invention relates generally to heat exchangers and, more particularly to modularization for stacked plate heat exchangers.

2. Description of the Related Art

The feedwater for steam generators in nuclear power plants is typically preheated before being introduced into the secondary side of the steam generators. Similarly, feedwater is preheated before being introduced into boilers for non-nuclear power plant applications. Feedwater heat exchangers are typically used for this purpose. Conventionally, heat exchanger designs are divided into two general classes; heat exchangers with a plate structure and those with a tube and shell structure. The major difference in the two classes, with regard to both construction and heat transfer, is that the heat transfer surfaces are mainly plates in one structure and tubes in the other.

The tube and shell heat exchanger in a number of feedwater heater applications employs a horizontal tubular shell having hemispherical ends. The inside of the horizontal shell is divided into sections by a tube sheet which is normal to the axis of the shell. More specifically, at one end of the shell, a water chamber section is defined that includes a water inlet chamber having a water inlet opening and a water outlet chamber having a water outlet opening. A plurality of heat transfer tubes are bent at their mid portions in a U shape and extend along the axis of the shell. These tubes are fixed to the tube sheet at both ends such that one end of each of the tubes opens in the water inlet chamber, while the other end opens in the water outlet chamber. The heat transfer tubes are supported by a plurality of tube supporting plates, spaced at a suitable pitch in the longitudinal direction of the tubes. An inlet opening for steam and a drain inlet and outlet are formed in the shell in the portion in which the tubes extend.

In operation, the feedwater coming into the feedwater heater from the water inlet chamber flows through the U-shaped heat transfer tubes and absorbs the heat from the heating steam coming into the feedwater heater from the steam inlet opening to condense the steam. The condensate is collected at the bottom of the shell and discharged to the outside through a drain in the bottom of the shell. Thanks to the cylindrical shape of the shell and the heat exchange tubes, the structure is well suited as a pressure vessel, and thus tube and shell heat exchangers have been used in extremely high pressure applications.

The most significant drawback of the tube and shell heat exchangers is their heavy weight when compared to the surface area of the heat transfer surfaces. Due to that, the tube and shell heat exchangers are usually large in size. Also, it is difficult to design and manufacture tube and shell heat exchangers when the heat transfer, flow characteristics and expense are taken into account.

A typical plate heat exchanger is composed of rectangular, ribbed or grooved plates, which are pressed against each other by means of end plates, which, in turn, are tightened to the ends of the plate stack by means of tension rods or tension screws. The clearances between the plates are closed and sealed with banded seals on their outer circumference and the seals are also used at the flow channels. Since the bearing capacity of the sleek plates is poor, they are strengthened with the grooves which are usually arranged crosswise in adjacent plates, wherein they also improve the pressure endurance of the structure when the ridges of the grooves are supported by each other. However, a more important aspect is the significance of the grooves for heat transfer; the shape of the grooves and their angle with respect to the flow, affect the heat transfer and pressure losses. In a conventional plate heat exchanger, a heat supplying medium flows in every other clearance between the plates, and a heat receiving medium in the remaining clearances. The flow is conducted in between the plates via holes located in the vicinity of the corners of the plates. Each clearance between the plates always contains two holes with closed rims and two other holes functioning as inlet and outlet channels for the clearance between the plates. The plate heat exchangers are usually constructed of relatively thin plates, when a small and light structure is desired. Because the plates can be profiled into any desired shape, it is possible to make the heat transfer properties suitable for almost any type of application. The greatest weakness in conventional plate heat exchangers is the seals which limit the pressure and temperature endurance of the heat exchangers. In several cases, the seals have impaired the possibility of use with heat supplying or heat receiving corrosive medium.

Attempts have been made to improve the plate heat exchanger construction by leaving out all of the seals and replacing them with soldered joints or welded seams. Plate heat exchangers fabricated by soldering or welding usually resemble those equipped with seals. The most significant external difference is the absence of tension screws between the ends. However, the soldered or welded structure makes it difficult if not impossible to nondestructively dissemble such heat exchangers for cleaning.

Attempts have been made to combine the advantages of the tube and shell heat exchanger and the plate heat exchanger in heat exchangers whose construction partly resembles both of these basic types. One such solution is disclosed in the U.S. Pat. No. 5,088,552, in which circular or polygonal plates are stacked on top of each other to form a stack of plates which is supported by means of end plates. The plate stack is encircled by a shell, the sides of which are provided with inlet and outlet channels for corresponding flows of heat supplying and heat receiving medium. Differing from the conventional plate heat exchanger, all flows into the clearances between the plates are directed from outside the plates. When the heat exchanger according to the publication is closed by welding, it is possible to attain the same pressures as when using a tube and shell heat exchanger, with the heat transfer properties of a plate heat exchanger.

International Publication WO 91/09262 purports to present an improvement on the foregoing publication, which more distinctly exhibits features typical of both plate heat exchangers and tube and shell heat exchangers. The circular plates are drawn together in pairs by welding them together by the rims of holes which form an inlet and outlet channel. By welding the plate pairs fabricated in the above manner together by the outer perimeters of the plates, a closed circuit is attained for the flow of one heat transfer medium. Differing from the conventional plate heat exchanger, this structure is welded and there are only two holes in the plates. The flow of another heat transfer medium is directed to every other clearance between the plates by means of a shell surrounding the stack of plates. In order to prevent the flow from running between the plate stack and the shell, seals are utilized which are primarily used as deflectors for the flow. Obviously, pressure endurance is not required of the deflectors. Due to the structure of the plate stack, it is difficult to implement the seals. Elastic rubber gaskets are suggested for the seals so that it is possible to dissemble the heat exchanger, e.g., for cleaning purposes.

The shell and tube heat exchanger currently used in nuclear power plants has a common design flaw that when tube degradation occurs, in an effort to minimize leakage, the only option is to plug the damaged tube resulting in a loss of thermal duty. The loss of thermal duty in the feedwater system is costly for nuclear power plants and eventually requires the replacement of the shell and tube feedwater heater. Another limitation of the shell and tube design is that the shell side inspection is typically limited to small hand holes and inspection ports and as a result corrosion/erosion damage is difficult to detect. Significant corrosion/erosion has been sustained by the internal baffling which can lead to (1) flow bypass and thermal performance degradation, and (2) tube wear due to flow induced vibration. Significant corrosion/erosion has also been observed on the inner shell surface of the shell and tube feedwater heater design.

Therefore, a new feedwater heater design is desired for long term, sustainable thermal duty and for improved long term component integrity relative to the current shell and tube feedwater heater design. Preferably, long term, sustainable thermal duty will be achieved by replacement or repair of the heat transfer surfaces, as needed, instead of requiring that the heat transfer surface be removed from service. Additionally, it is desirable to be able to increase the heat transfer capability of the feedwater heater to accommodate power plant uprates without replacing the entire feedwater heater.

SUMMARY OF THE INVENTION

The foregoing objectives are achieved by a modular plate and shell feedwater heater in which welded heat transfer plate pairs are placed in a shell in order to transfer heat from the drain flow and extraction steam to the feedwater in a nuclear power plant. The heat transfer plate pairs are connected using gaskets to header pipes which are connected to feedwater inlet and outlet nozzles. The header pipes are supported by a structure which rests on and is moveable along an internal track attached to the shell, which facilitates removal of the heat transfer plates. The modular plate and shell feedwater heater has a removable head integral with the shell for removal of the heat transfer plates for inspection, repair or replacement.

In one embodiment, the inlet and outlet headers include a number of additional attachment points for pairs of the heat transfer plates, that are initially plugged. The additional heat transfer plates can be added at a later time to accommodate plant upratings. Desirably, the coupling between the pairs of heat transfer plates and the headers are detachable for ease in repair and replacement.

In another embodiment, a number of the pairs of heat transfer plates are connected in a series arrangement with the series arrangement connected at either end to the inlet header and outlet header. Preferably, a manway is provided in the shell for gaining access to the interior of the shell for disconnecting the feedwater inlet nozzle from the feedwater inlet header pipe and for disconnecting the feedwater outlet header pipe from the feedwater outlet nozzle.

The invention also provides for a method of cleaning or repairing the feedwater heater which includes the steps of: accessing the interior of the pressure vessel shell; removing at least one pair of heat transfer plates from the heat transfer assembly of heat transfer plates; cleaning, repairing, or replacing the removed pair of heat transfer plates; and reconnecting the cleaned, repaired or replaced pair of heat transfer plates to the heat transfer assembly. Preferably, the step of accessing the interior of the pressure vessel shell includes either removing the detachable head or opening the manway on the pressure vessel and the step of removing at least one pair of heat transfer plates comprises removing the one pair of heat transfer plates from the feedwater inlet header pipe and the feedwater outlet header pipe.

The invention further includes a method of repairing, inspecting, cleaning or uprating the feedwater heater wherein the pressure vessel has a detachable head. The method comprises the steps of: accessing the interior of the pressure vessel shell; and disconnecting the feedwater inlet header piper and the feedwater outlet header pipe from the feedwater inlet nozzle and the feedwater outlet nozzle, respectively, while the heat transfer assembly is in the pressure vessel. This method further includes the step of replacing a defective pair of heat transfer plates as well as the step of increasing the number of pairs of heat transfer plates after the feedwater heater has been placed in service to uprate the feedwater heater.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Current feedwater heater designs employed in nuclear power plants utilize a shell and tube heat exchanger arrangement. Another general type of heat exchanger that has been in existence since 1923 is the plate and frame heat exchanger. The latter is characterized by a compact design, high heat transfer coefficients, high fluid pressure drop within the plates and is generally limited to low pressure fluids. This invention provides a plate and shell feedwater heater that combines and optimizes the aspects of a plate and frame heat exchanger and the traditional shell and tube type heat exchanger.

Figure 1:
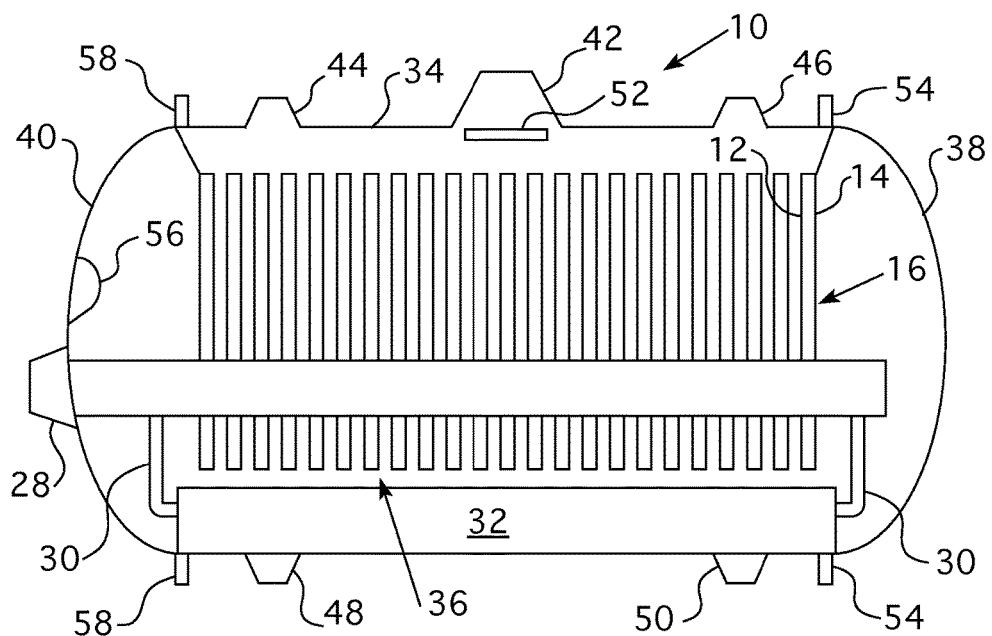
FIG. 1 is an elevation view of the feedwater heater of this invention.
Figure 2:
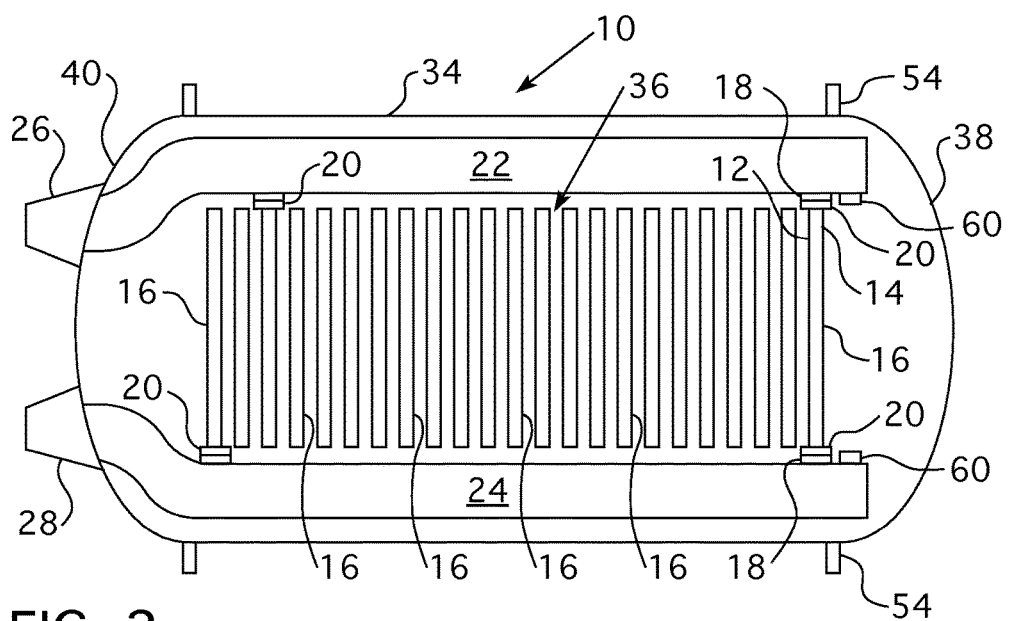
FIG. 2 is a top view of the feedwater heater of this invention shown in FIG. 1.

The feedwater heater 10 of this invention is illustrated in the elevational view shown in FIG. 1 and the top view shown in FIG. 2. Two heat transfer plates 12 and 14 are welded together to form a welded plate pair 16 that therebetween form a path for feedwater fluid as in a traditional plate heat exchanger. The heat transfer plate pair 16 are removably connected, such as with gaskets 18 and bolted flange joints 20, to an inlet header pipe 22 at one end of the welded plate pair 16 and an outlet header pipe 24 at the other end of the welded plate pair 16. A number of these welded plate pairs are stacked in a spaced tandem arrangement, each coupled between the inlet header and outlet header to form a heat transfer assembly having a parallel flow path. One such arrangement is shown on the right side of FIG. 2. Alternately, it should be appreciated that a number of the heat transfer plate pairs 16 can be coupled in series with the ends of the series arrangement removably attached in a similar fashion to the inlet header pipe 22 and the outlet header piper 24 as shown on the left side of FIG. 2. In either embodiment, the terminal ends of the heat transfer plate pairs 16 are connected to the inlet header pipe 22 and the outlet header pipe 24. The inlet header pipe 22 and the outlet header pipe 24 are respectively connected to a feedwater inlet and a feedwater outlet nozzle 26 and 28 using a bolted closure with gaskets in a manner similar to that described for removably fastening the pair of heat transfer plates 16 to the inlet and outlet header pipes 22 and 24, though it should be appreciated that other means of removable attachment may be used. The header pipes 22 and 24 are supported by a structure 30 which rests on an internal track 32 attached to the lower portion of the cylindrical shell 34 that forms a pressure vessel that surrounds the heat transfer plate assembly 36. The track 32 facilitates removal of the heat transfer plate assembly for repair, cleaning or uprating. The shell has an integral hemispherical end 38 on one side and a removable hemispherical head 40 on the other side to completely enclose and seal the heat transfer assembly 36 within the pressure vessel formed by the cylindrical shell 34, hemispherical end 38 and removable head 40. Though it should be appreciated that the ends need not be hemispherical to take advantage of this invention, though hemispherical ends are preferable for high pressure applications. The removable head 40 has the feedwater inlet nozzle 26 and the feedwater outlet nozzle 28 extending therethrough as shown in FIGS. 1 and 2. Alternately, the hemispherical end 38 can be constructed to be removable instead of the head 40 or both can be connected by bolted flange connections to the shell 34 for added flexibility in gaining access to the interior of the shell 34 to service the heat transfer plate assembly 36. The shell 34 is also fitted with an extraction steam inlet 42, drain inlets 44 and 46 and drain outlets 48 and 50.

During operation, the inlet feedwater passes through the inlet nozzle 26, the inlet header pipe 22, the heat transfer welded plate pairs 16, where it is heated by the drain flow and extraction steam, the outlet header pipe 24 and the outlet nozzle 28. The extraction steam, upon entering the feedwater heater through the extraction steam inlet 42, is distributed by the steam impingement plate 52 and passes through the upper shell region where it mixes with the entering drain flow from the drain flow inlet nozzles 44 and 46. The extraction steam and drain flow then pass between the heat transfer plates, where it is cooled by the feedwater and condenses to the lower shell region where it exits through the drain flow outlet nozzles 48 and 50.

During a plant outage inspection of the heat transfer plates and shell internal surface can be performed using the following steps. First, the shell end 38 is unbolted at the flange 54 and removed. The header pipes 22 and 24 are then disconnected from the inlet and outlet nozzles 26 and 28. A manway 56 on the head 40 can be used to gain access to the connection between the inlet and outlet header pipes 22 and 24 and the inlet and outlet nozzles 26 and 28. Alternately, when the head 40 is removable at the flange 58, the head 40 can be moved out with the heat transfer assembly 36 sliding on the track 32 so that access can be gained to the connection between the inlet and outlet headers 22 and 24 and the feedwater inlet and outlet nozzles 26 and 28. Next, the heat transfer plate assembly 36 can be moved as a unit along the tracks 32 located in the bottom of the shell 34 to a point where the individual heat transfer plates 12 and 14 and the interior of the shell 34 can be inspected for damage. The individual heat transfer plate pairs 16 can then be cleaned or if necessary repaired or replaced. If repair or replacement is necessary, the heat transfer plate pair 16 in need of attention can be unbolted from the inlet header pipe 22 and the outlet header pipe 24 and replaced with a new or repaired heat transfer plate pair 16 bolted in its place. The outlet header pipe and inlet pipe are also provided with one or more additional openings 60 that are initially sealed by plugs. These additional openings can accommodate additional heat transfer plate pairs 16 if uprating in the future is desirable.

The removable plate design allows for replacement of the heat transfer surface and mass production of heat transfer plates and gaskets results in a relatively low cost for critical spares. Employing this design makes it possible to increase the number of plates and thus the heat transfer area to accommodate power uprates and provides improved shell side inspection.

While specific embodiments of the invention have been described in detail, it will be appreciated by those skilled in the art that various modifications and alternatives to those details could be developed in light of the overall teachings of the disclosure. For example, while separate inlet and outlet header pipes are shown, any other structure that performs their stated function may also be used without departing from the spirit of this invention. Additionally, while the preferred embodiment is described in an application to a feedwater heater the invention can be employed with similar benefit in most other types of heat exchangers. Accordingly, the particular embodiments disclosed are meant to be illustrative only and not limiting as to the scope of the invention which is to be given the full breadth of the appended claims and any and all equivalents thereof.

What is claimed is:

1. A method of cleaning or repairing a heat exchanger comprising:

an elongated pressure vessel shell having an axial dimension with a removable head at one end of the axial dimension, a primary fluid inlet, a primary fluid outlet, a secondary fluid inlet, a drain outlet and a heat transfer assembly comprising:

a primary fluid inlet conduit extending into the pressure vessel from the primary fluid inlet;

a primary fluid outlet conduit extending into the pressure vessel from the primary fluid outlet; and a plurality of pairs of heat transfer plates supported in tandem with each of the pairs of plates sealed around a periphery to define a primary flow channel in between a first and second heat transfer plate of each pair, with each pair having a heat transfer plate inlet opening fluidly connected either directly or indirectly to the primary fluid inlet conduit and a heat transfer plate outlet opening fluidly connected either directly or indirectly to the primary fluid outlet conduit to form a parallel flow path with flow in the same direction through each of the pairs of heat transfer plates in a direction orthogonal to the elongated dimension of the pressure vessel shell; and wherein the plurality of pairs of heat transfer plates are arranged in tandem and at least some of the plurality of pairs of heat transfer plates are respectively connected to an adjacent pair of heat transfer plates or the primary fluid inlet or the primary fluid outlet with a nondestructively removable mechanical coupling seal, whereby each pair of the at least some of the pairs of heat transfer plates is constructed to be disconnectable from the heat transfer assembly without disturbing the nondestructively removable mechanical coupling seal associated with any of the other nonadjacent pairs of heat transfer plates;

the method comprising the steps of:
accessing the interior of the pressure vessel shell;
removing at least one pair of heat transfer plates from the heat transfer assembly by uncoupling the corresponding nondestructive mechanical coupling seal without having to uncouple the adjacent pairs of heat transfer plates from a remaining pairs of heat transfer plates;
cleaning, repairing or replacing the removed pair(s) of heat transfer plates; and
reconnecting the cleaned, repaired or replaced pair(s) of heat transfer plates to the heat transfer assembly.

2. The method of cleaning or repairing the heat exchanger of claim 1 wherein the step of accessing the interior of the pressure vessel shell comprises either removing a detachable head or opening a manway on the pressure vessel and the step of removing at least one pair of heat transfer plates comprises removing the at least one pair of heat transfer plates from the primary fluid inlet conduit and the primary fluid outlet conduit.

3. A method of repairing, inspecting, cleaning or uprating a heat exchanger comprising
an elongated pressure vessel shell having an axial dimension with a removable head at one end of the axial dimension, a primary fluid inlet, a primary fluid outlet, a secondary fluid inlet, a drain outlet and a heat transfer assembly comprising:
a primary fluid inlet conduit extending into the pressure vessel from the primary fluid inlet;
a primary fluid outlet conduit extending into the pressure vessel from the primary fluid outlet; and
a plurality of pairs of heat transfer plates supported in tandem with each of the pairs of plates sealed around a periphery to define a primary flow channel in between a first and second heat transfer plate of each pair, with each pair having a heat transfer plate inlet opening fluidly connected either directly or indirectly to the primary fluid inlet conduit and a heat transfer plate outlet opening fluidly connected either directly or indirectly to the primary fluid outlet conduit to form a parallel flow path with flow in the same direction through each of the pairs of heat transfer plates in a direction orthogonal to the elongated dimension of the pressure vessel shell; and
wherein the plurality of pairs of heat transfer plates are arranged in tandem and at least some of the plurality of pairs of heat transfer plates are connected to an adjacent pair of heat transfer plates or the primary fluid inlet or the primary fluid outlet with a nondestructively removable mechanical coupling seal, whereby each pair of the at least some of the pairs of heat transfer plates is constructed to be disconnectable from the heat transfer assembly without disturbing the nondestructively removable mechanical coupling seal associated with any of the other nonadjacent pairs of heat transfer plates;

the method comprising the steps of:
accessing the interior of the pressure vessel shell;
disconnecting the primary fluid inlet conduit and the primary fluid outlet conduit from the primary fluid inlet and the primary fluid outlet, respectively, while the heat transfer assembly is in the pressure vessel shell; and
replacing or repairing a defective pair of heat transfer plates by uncoupling the corresponding nondestructive mechanical coupling seal without having to uncouple the adjacent pairs of heat transfer plates from a remaining pairs of heat transfer plates.

4. The method of claim 3 including the step of replacing a defective pair of heat transfer plates.

5. The method of claim 3 including the step of increasing the number of pairs of heat transfer plate pairs after the heat exchanger has been placed in operation to uprate the heat exchanger.

* * * * *